United States Patent [19]

Tormari et al.

[11] Patent Number: 4,652,310

[45] Date of Patent: Mar. 24, 1987

[54] PROCESS FOR MAKING A HARDENING AGENT FOR WEAK SOIL OR SLUDGE FROM STEEL MAKING SLAG

[75] Inventors: Makao Tormari; Takashi Toshimitsu; Hiroyuki Jogo, all of Fukuoka, Japan

[73] Assignee: Nippon Magnetic Dressing Co., Ltd., Kitakyushu, Japan

[21] Appl. No.: 800,015

[22] Filed: Nov. 20, 1985

[51] Int. Cl.$^4$ .............................................. B22F 1/00
[52] U.S. Cl. ........................................ 75/256; 75/24; 75/25
[58] Field of Search .............................. 75/24, 25, 256

[56] References Cited

U.S. PATENT DOCUMENTS

| | | | |
|---|---|---|---|
| 3,849,117 | 11/1974 | Philpotts | 75/24 |
| 4,062,672 | 12/1977 | Kunicki | 75/24 |
| 4,141,722 | 2/1979 | Takai | 75/24 |
| 4,179,279 | 12/1979 | Harada | 75/24 |

Primary Examiner—Peter D. Rosenberg
Attorney, Agent, or Firm—Jordan and Hamburg

[57] ABSTRACT

A process for making a hardening agent for weak soil or sludge from steelmaking slag. About 5-30 wt. % of specified reforming agent selected from the group consisting of one or more of silicate rock, mineral, calamine, glass waste, foundry waste sand, waste brick, red mud, volcanic slag, iron oxide and mixtures thereof is added to a molten steelmaking slag, causing a reaction forming a reacted steelmaking slag. The reacted steelmaking slag is then rapidly cooled to form a powder. Iron is then removed from the powder and the powder is then mixed with from about 3-5% of a powder selected from the group consisting of one or more of lime, plaster and cement to form a hardening agent for weak soil or sludge.

12 Claims, No Drawings

PROCESS FOR MAKING A HARDENING AGENT FOR WEAK SOIL OR SLUDGE FROM STEEL MAKING SLAG

BACKGROUND OF THE INVENTION

The present invention relates to a process for using steelmaking slag which is produced but not disposed, of wherein the steelmaking slag is used as a reforming agent for weak soil or sludge.

Steelmaking slag usually contains $2CaO.SiO_2$, $F.CaO$, $F.MgO$, $2CaO.Fe_2O_3$, $4CaO.Al_2O_3.Fe_2O_3$, $Fe_2O_3$, $Fe_3O_4$ and $FeO$, etc.

The steelmaking slag is received by a cinder plate and is discharged $2CaO.SiO_2$ causes expansion and collapse at the time of converting $\beta \rightarrow \alpha$ and $F.CaO$ or $F.MgO$ contained as components also cause expansion and collapse. Therefore, most of the steelmaking slag is disposed of without reclamation.

Cement is used for weak soil or sludge, but a great quantity of cement is required and is very expensive.

SUMMARY OF THE INVENTION

It is an object of the present invention to improve steelmaking slags, which are unused natural resources. The steelmaking slag is used for the hardening of weak soil or sludge.

Another object of the present invention is achieved by adding 5-30 wt.% of a reforming agent consisting of one or more groups of silicate rock, mineral, calamine, glass waste, foundry waste sand, waste brick, red mud, volcanic spouting matter, blast furnace slag, desilica slag and iron oxide to molten steelmaking slag to produce a molten reaction rapidly cooling the reacted molten steelmaking slag treating the cooled product to remove iron, and mixing the resulting steelmaking powder and 3-5 wt.% of a powder consisting of one or more groups of lime, plaster and cement.

ing granular or powdery reforming agent with bubbling gas into the molten steelmaking slag by a lanspipe is especially preferable in improving the molten reaction. Addition of the reforming agent lowers the melting point and viscosity of the steelmaking slag, and facilitates a rapid and sufficient subsequent cooling. The mineral composition is changed from $\alpha' \sim \beta - 2CaO.SiO_2$ to $2CaO.SiO_2 \sim 2CaO.MgO.2SiO_2$, and is steadied after rapid cooling because glass becomes the main composition. Less than 5 wt.% of the reforming agent does not result in any particular improvement in the above-mentioned mineral composition of the steelmaking slag, or lowering of the melting point and viscosity. It is preferable the molten reaction take place due only to the sensitive heat of the steelmaking slag because of operation efficiency and economic considerations. Therefore, 30 wt.% maximum reforming agent is preferable for the above-mentioned reasons. Rapid cooling by the water throwing system is usually used after the molten reaction with the reforming agent. Iron contained in the steelmaking slag is recovered by magnetic dressing or other proper processes. The treated steelmaking slag is thus obtained. Suitable grinding is carried out at the time of recovering iron because iron and other matter are separated. The resulting steelmaking slag can be finely ground before or after adding one or more of lime, plaster and cement. The particle size is preferably as small as possible. The brain value is more than $3200$ cm$^2$/g.

A three (3) wt.% minimum of lime, plaster and cement is required for mixing with the treated steelmaking slag. Otherwise, the hardening ability for weak soil or sludge becomes low, and it takes a long time to harden. However, over 5 wt.% does not adversely affect the hardening ability. Therefore, between 3 and 5 wt.% lime, plaster, or cement is preferable.

Embodiment and results will now be shown.

Table 1 shows the chemical analytical values of the raw materials used in the embodiment.

TABLE 1

| Material | Chemical Analytical Values (wt. %) | | | | | | | | | Collapse Values (%) | Remarks |
|---|---|---|---|---|---|---|---|---|---|---|---|
| | Ig. Loss | SiO$_2$ | Al$_2$O$_3$ | T.Fe | CaO | MgO | MnO | Na$_2$O | K$_2$O | | |
| Steelmaking slag (A) | +2.5 | 9.9 | 1.0 | 21.5 | 43.5 | 6.7 | 4.6 | 0.2 | 0.0 | 35.0 | Converter slag |
| Steelmaking slag (B) | +0.9 | 19.4 | 4.3 | 27.5 | 39.0 | 4.2 | 4.8 | 0.2 | 0.0 | 6.5 | Electric furnaces slag (oxidizing term) |
| Steelmaking slag (C) | 0.7 | 27.4 | 3.9 | 0.6 | 44.5 | 6.3 | — | 0.1 | 0.0 | 100.0 | (reducing term) |
| Blast furnace | 2.0 | 29.5 | 14.1 | 0.6 | 41.4 | 6.4 | — | 0.05 | 0.01 | 0.2 | |
| Granite | 2.3 | 70.2 | 14.5 | 3.1 | 0.9 | 0.6 | — | 2.7 | 1.9 | — | |
| Sandstone | 1.9 | 71.5 | 14.2 | 2.5 | 0.6 | 0.5 | — | 2.9 | 0.9 | — | |
| Slate | 6.6 | 63.3 | 15.5 | 4.3 | 1.7 | 1.3 | — | 1.1 | 0.9 | — | |
| Sand (river sand) | 0.2 | 87.2 | 3.1 | 0.2 | 0.2 | 0.1 | — | 1.1 | 0.3 | — | |
| Calamine | +3.3 | 29.0 | 17.4 | 28.7 | 12.1 | 2.8 | — | — | — | — | |
| Glass waste | — | 73.0 | 2.0 | 0.4 | 5.8 | 3.4 | — | 14.7 | 0.5 | — | |
| Foundry waste sand | 5.3 | 86.1 | 3.0 | 0.2 | 2.0 | 0.1 | — | 1.0 | 1.1 | — | |
| Coal ash | — | 55.9 | 26.0 | 3.6 | 5.4 | 2.0 | — | — | — | — | |
| Dequartzite slag | — | 29.6 | 12.3 | 7.6 | 32.5 | 4.5 | — | 0.2 | 0.0 | — | |
| Iron ore (A) | — | 1.5 | 1.2 | 63.5 | — | — | — | — | — | — | |

DESCRIPTION OF THE PREFERRED EMBODIMENTS

First, the reforming agent consisting of silicate rock or mineral is added to a molten steelmaking slag having a high sensitive heat, and the molten reaction is takes place by virtue of the high sensitive heat of the molten steelmaking slag. Adding the reforming agent is not restricted if the mixed powder is mixed enough. Charg- Steelmaking slags (A), (B) and (C) in Table 1 above show the composition of steelmaking slags from which iron is recovered. The collapse values were calculated under the conditions of 20 Kg/cm$^2$, 200° C., 3 hours and 10-25 mm based on the ASTM method, and the results show less than 10 mm of collapsed matter.

Table 3 shows the results in which the melting heat of each mixture shown in the following Table 2 was determined with materials shown in Table 1 by Seger Cone method.

In Table 4, symbol ⊙ means 'very hard', pushing with a hand, symbol ○ means 'hard', symbol △ means 'a little hard', and symbol X means 'non-harden'.

Samples No. 1 and No. 2, which were not rapidly cooled with water, were not completely hardened, as shown in Table 4. Other samples which were rapidly cooled with the reforming agent started to harden in the early steps.

Most samples cooled with the foregoing agent were mainly made of glass, and β and $\alpha'-2Ca.SiO_2$ existed.

An embodiment of the present invention will now be described

TABLE 2

| Material | \multicolumn{21}{c}{Sample} |
|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 |
| Steelmaking slag (A) | 100 |  | 95 | 90 | 80 | 80 | 85 | 90 | 80 | 80 | 85 |  |  |  |  |  |  |  |  |  |  |
| Steelmaking slag (B) |  | 100 |  |  |  |  |  |  |  |  |  | 90 | 80 | 90 | 85 | 80 | 80 |  |  |  |  |
| Steel making slag (C) |  |  |  |  |  |  |  |  |  |  |  |  |  |  |  |  |  | 100 | 95 | 90 | 90 |
| Granite |  |  | 5 | 10 | 20 | 5 |  |  |  |  |  |  |  |  |  |  |  |  | 5 |  |  |
| Sandstone |  |  |  |  |  | 5 |  |  |  |  |  | 10 | 20 |  |  |  | 10 |  |  | 10 |  |
| Slate |  |  |  |  |  | 10 |  |  | 20 | 5 |  |  |  |  |  |  |  |  |  |  |  |
| Sand |  |  |  |  |  |  | 10 |  |  |  |  |  |  | 10 |  |  |  |  |  |  |  |
| Coal ash |  |  |  |  |  |  |  | 5 |  |  |  |  |  |  | 5 |  |  |  |  |  |  |
| Dequartzite slag |  |  |  |  |  |  |  |  | 10 |  |  |  |  |  |  | 5 | 5 |  |  |  |  |
| Iron ore (A) |  |  |  |  |  |  |  |  |  | 5 |  |  |  |  |  | 5 |  |  |  |  |  |
| Glass waste |  |  |  |  |  |  |  | 5 |  |  | 5 |  |  |  |  |  |  |  |  |  |  |
| Calamine |  |  |  |  |  |  |  | 5 |  |  |  |  |  |  |  |  | 5 |  |  |  |  |
| Foundry waste sand |  |  |  |  |  |  |  |  |  | 10 |  |  |  |  | 5 | 10 |  |  |  |  |  |

TABLE 3

| Sample No. | 1 | 2 | 3 | 4 | 5 | 6 | 7 | 8 | 9 | 10 | 11 |
|---|---|---|---|---|---|---|---|---|---|---|---|
| Melting-temperature (°C.) | 1520 | 1505 | 1315 | 1295 | 1290 | 1290 | 1300 | 1295 | 1230 | 1290 | 1235 |

| Sample No. | 12 | 13 | 14 | 15 | 16 | 17 | 18 | 19 | 20 | 21 |
|---|---|---|---|---|---|---|---|---|---|---|
| Melting-temperature (°C.) | 1290 | 1285 | 1290 | 1285 | 1280 | 1270 | 1550 | 1320 | 1295 | 1290 |

The examples show that steelmaking slags No. 1, No. 2 and No. 18, which have high melting points by themselves become mixtures having low melting points by adding the reforming agent as shown in Table 3.

Next, the mixtures in Table 2 were dried in an isothermal dryer furnace at 115°–110° C. for more than 24 hours, the dried mixture was dissolved in a Sliconit electric furnace at 1500° C., the dissolved mixture was taken out from the furnace and was cooled in water, and the cooled mixture was dried again. The dried mixture was then ground to under 200 mesh, 3 wt.% of lime was mixed to the ground mixture with water, and the mixture was then closed up in a vinyl sack.

Table 4 shows the harden-state of the mixtures.

EMBODIMENT

Each sample in Table 2 ground to under 200 mesh was added to sludge containing 30.5 wt.% of water (kailinite, montmorillonite and α—quartz) by a morter pasting pot. The sludge was then divided into three layers by the soil treating mold lanner, and the divided sludge was cultivated wet for 1 month.

Table 5 shows the resulting crushing strength.

TABLE 4

| Sample No. | 1 | 2 | 3 | 4 | 5 | 6 | 7 | 8 | 9 | 10 | 11 | 12 | 13 | 14 | 15 | 16 | 17 | 18 | 19 | 20 | 21 | raw material No. 1 | raw material No. 2 | Blast furnace cooled by water (products on market) |
|---|---|---|---|---|---|---|---|---|---|---|---|---|---|---|---|---|---|---|---|---|---|---|---|---|
| Hardening State |  |  |  |  |  |  |  |  |  |  |  |  |  |  |  |  |  |  |  |  |  |  |  |  |
| 1 day later | △ | △ | ○ | ○ | ○ | ○ | ○ | ○ | ○ | ○ | ○ | ○ | ○ | ○ | ○ | ○ | △ | ○ | ○ | ○ | ○ | x | x | △ |
| 3 days later | ○ | ○ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | x | x | ○ |
| 7 days later | ○ | ○ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | x | x | ⊙ |

TABLE 5

| Specimen No. | 1 | 2 | 3 | 4 | 5 | 6 | 7 | 8 | 9 | 10 | 11 |
|---|---|---|---|---|---|---|---|---|---|---|---|
| Sludge | 100 | 95 | 90 | 92 | 87 | 92 | 87 | 92 | 87 | 77 | 87 |
| Cement |  | 5 | 10 |  |  |  |  |  |  |  |  |
| Quick lime |  |  |  | 3 |  | 3 | 3 | 3 | 3 | 3 | 1.5 |
| Plaster |  |  |  |  | 3 |  |  |  |  |  | 1.5 |
| Sample No. |  |  |  | 1 | 1 | 2 | 2 | 4 | 4 | 4 | 10 |

TABLE 5-continued

| | | | | | | | | | | | |
|---|---|---|---|---|---|---|---|---|---|---|---|
| Amount of addition | | | | 5 | 10 | 5 | 10 | 5 | 10 | 20 | 10 |
| Hardening-state | Touching inspection | 1 day later | x | O | O | Δ | O | O | O | O | O | O |
| | | 3 days later | x | O | O | O | O | O | O | O | O | O |
| | Crushing strength (30 days) (Kg/cm) | | 0 | 5.5 | 12.9 | 6.7 | 10.5 | 10.0 | 10.5 | 11.0 | 11.5 | 15.7 | 11.0 |

| Specimen No. | | | 12 | 13 | 14 | 15 | 16 | 17 | 18 | 19 | 20 | 21 |
|---|---|---|---|---|---|---|---|---|---|---|---|---|
| Sludge | | | 92 | 77 | 87 | 77 | 87 | 87 | 92 | 87 | 92 | 87 |
| Cement | | | | | | | | | 2 | 3 | 3 | 3 |
| Quick lime | | | 1.5 | 1.5 | 3 | 2 | 3 | 3 | | | | |
| Plaster | | | 1.5 | 1.5 | | 1 | | | | | | |
| Sample No. | | | 12 | 12 | 13 | 13 | BF | 4 BF | 4 | 4 | 12 | 12 |
| Amount of addition | | | 5 | 20 | 10 | 20 | 10 | 5 5 | 5 | 10 | 5 | 10 |
| Hardening-state | Touching inspection | 1 day later | O | O | O | O | Δ | | O | O | O | O |
| | | 3 days later | O | O | O | O | O | O | O | O | O | O |
| | Crushing strength (30 days) (Kg/cm) | | 9.1 | 13.5 | 12.0 | 15.0 | 6.1 | 8.5 | 8.8 | 11.8 | 9.4 | 12.4 |

'BF' for specimen No. 16 and No. 17 in Table 5 means Blast Furnace Slag which is rapidly cooled with water.

Symbol O means 'hard', pushing with a hand, symbol Δ means 'a little hard' and symbol X means 'non-harden'.

The present invention shows the same effect when using cement, or more considerable effect in the hardening, and is enough used for the sludge hardening agent as shown in the Embodiment.

Sample No. 1, to which was not added the reforming agent, hardly hardened except after the addition of lots of sample No. 1, and the strength after hardening is low as shown in specimens No. 4 and No. 5.

As mentioned above, in the present invention, molten steelmaking slag is effectively reacted with silicate rock or a reforming agent consisting of minerals by using sensitive heat. The reacted steelmaking slag is rapidly cooled, and considerably high strength is achieved by adding lime, plaster or cement etc. A hardening agent for weak soil or sludge is obtained.

Furthermore, the steelmaking slag, which is industrial waste is mainly used as raw material in the process of the present invention, which is very economical.

What we claim are:

1. A process for making a hardening agent from steelmaking slag, comprising
    adding a reforming agent selected from the group consisting of silicate rock, mineral, calamine, glass waste, foundry waste sand, waste brick, red mud, volcanic spouting matter, blast furnace slag, desilica slag, iron oxide and mixtures thereof to a molten steelmaking slag to produce a molten reaction forming a reacted steelmaking slag;
    rapidly cooling the reacted steelmaking slag to form a powder;
    removing iron from the powder; and
    mixing the powder with an agent selected from the group consisting of lime, plaster, cement and mixtures thereof to form a hardening agent for weak soil or sludge.

2. A process according to claim 1, wherein the molten reaction is initiated by the heat of the molten steelmaking slag.

3. A process according to claim 1, wherein the reforming agent is added to the molten steelmaking slag as a granular powder.

4. A process according to claim 1, wherein the agent is mixed with the powder as a powder.

5. A process according to claim 1, wherein addition of the reforming agent to the molten steelmaking slag lowers the temperature and viscosity of the steelmaking slag.

6. A process according to claim 1, wherein iron is removed from the powder by magnetic dressing.

7. A process according to claim 1, further comprising finely grinding the powder to a brain value greater than 3200 $cm^2/g$ before mixing to form the hardening agent.

8. A process according to claim 1, wherein the powder is mixed with from about 3 to about 5% by weight of the powder of the agent selected from the group consisting of lime, plaster, cement and mixtures thereof to form the hardening agent.

9. A process according to claim 1, wherein the reforming agent is added to the molten steelmaking slag in an amount from about 5 to about 30% by weight of the molten steelmaking slag.

10. A process according to claim 1, wherein the reacted steelmaking slag is rapidly cooled in water.

11. A process according to claim 1, further comprising adding the hardening agent to weak soil.

12. A process according to claim 1, further comprising adding the hardening agent to sludge.

* * * * *